United States Patent Office 3,333,622
Patented Aug. 1, 1967

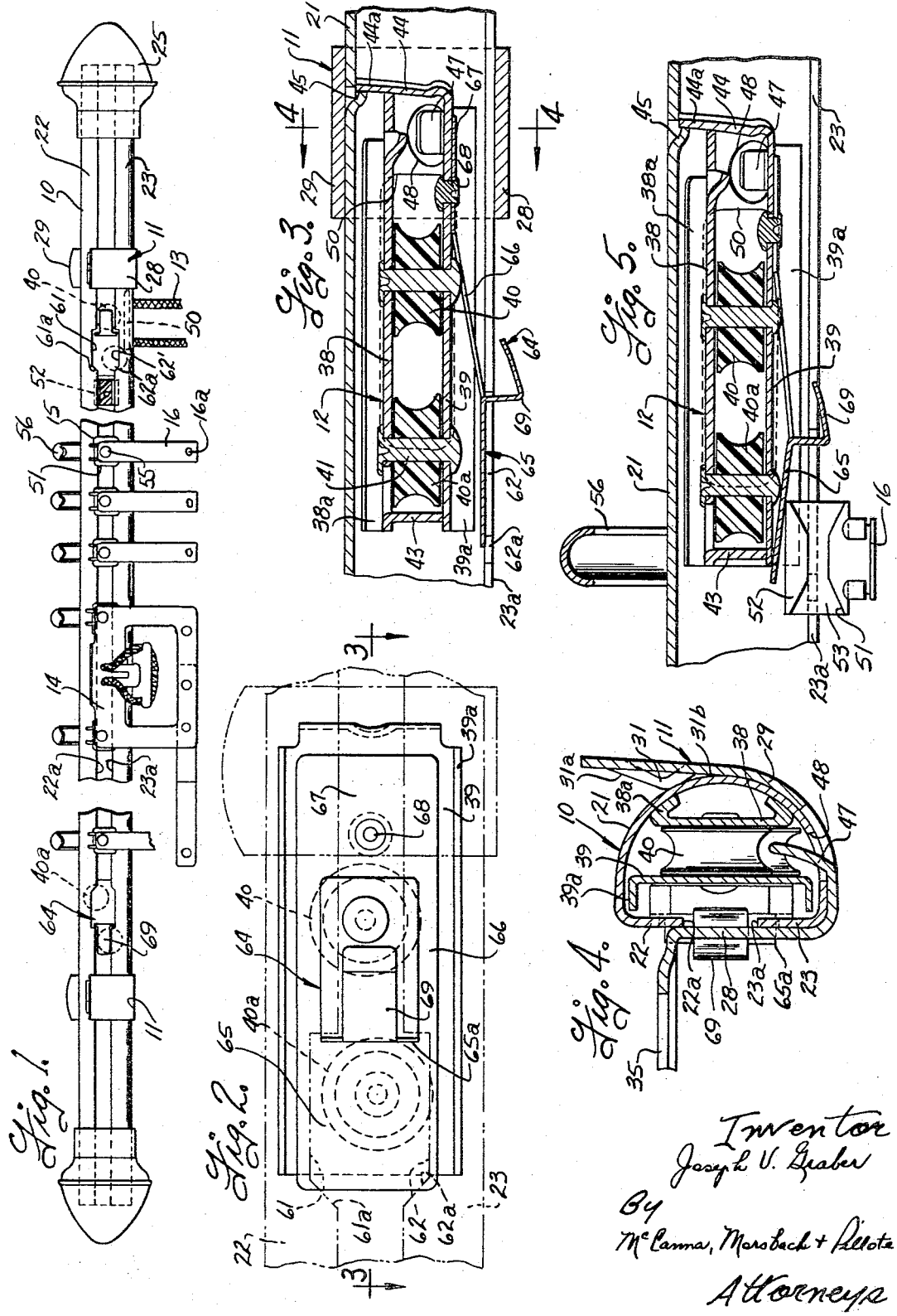

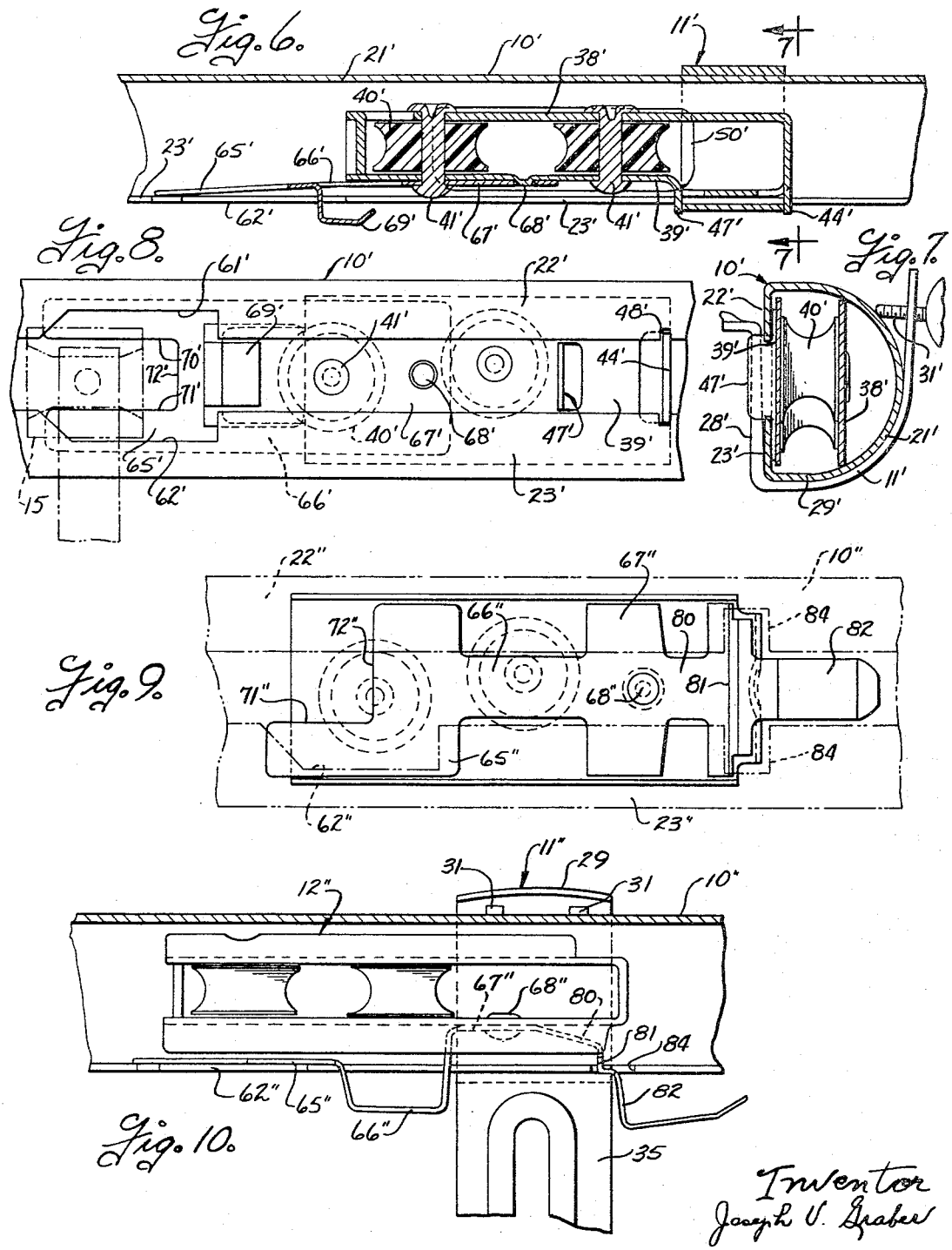

3,333,622
DRAPERY ROD FIXTURE
Joseph V. Graber, Madison, Wis., assignor to Graber Manufacturing Company, Inc., Middleton, Wis., a corporation of Wisconsin
Filed Oct. 19, 1964, Ser. No. 404,829
14 Claims. (Cl. 160—345)

This invention relates to improvements in traverse rods for draperies and the like.

An important object of this invention is to provide a drapery rod in which the cord guide pulley housing is mounted inside the rod inwardly of the end of the rod, and which rod has a novel slide gate arrangement whereby slides can be inserted and removed from the rod intermediate the ends of the latter.

Another object of this invention is to provide a drapery rod supported by brackets engaging the rod inwardly of the ends thereof and having a pulley housing mounted within the rod inwardly of the end of the rod, in which slides can be inserted and removed from the rod without removing the rod from its support brackets.

Another object of this invention is to provide a slide gate in a traverse rod wherein the slide gate is substantially enclosed and concealed in the rod.

Yet another object of this invention is to provide a drapery rod in which the cord guide pulley housing is mounted within the rod and the rod has a slide gate intermediate its ends adjacent to the pulley housing to enable insertion and removal of the slides from the rod, which slide gate is constructed and arranged to reduce the dead space adjacent the pulley housing in which the slides cannot move.

A further object of this invention is to provide a drapery rod having a cord guide pulley housing mounted within the rod inwardly of the ends of the rod which has an improved arrangement for anchoring the pulley housing against movement lengthwise of the rod due to the forces applied to the pulley housing during operation of the traverse cords.

Still another object of this invention is to provide a drapery rod supported by brackets which engage the rod inwardly of the ends of the rod and having cord guide pulley housing mounted within the rod inwardly of the ends of the rod, and wherein the pulley housing is anchored directly to the rod support bracket to inhibit movement of the pulley housing lengthwise of the rod due to the forces applied to the pulley housing during operation of the traverse cords.

These, together with other objects and advantages of this invention will be more readily appreciated as the invention becomes better understood by reference to the following detailed description when taken in connection with the accompanying drawings wherein:

FIGURE 1 is a fragmentary rear elevational view of a traverse rod embodying the invention;

FIG. 2 is an enlarged view illustrating the pulley housing and slide gate arrangement;

FIG. 3 is a fragmentary longitudinal sectional view through the rod and pulley housing taken on plane 3—3 of FIG. 2;

FIG. 4 is a fragmentary transverse sectional view taken on plane 4—4 of FIG. 3;

FIG. 5 is a fragmentary longitudinal sectional view taken on the plane 3—3 of FIG. 2 and illustrating the slide gate in a moved position;

FIG. 6 is a fragmentary longitudinal sectional view through a modified rod and illustrating a modified form of pulley housing and slide gate;

FIG. 7 is a fragmentary transverse sectional view taken on the plane 7—7 of FIG. 6;

FIG. 8 is a fragmentary rear elevational view of the rod and pulley housing of FIG. 6;

FIG. 9 is a fragmentary rear elevational view of a further modified form of pulley housing and slide gate; and FIG. 10 is a longitudinal sectional view through the rod and illustrating the pulley housing of FIG. 9.

The traverse rod illustrated in FIG. 1 in general includes an elongated rod 10 which is supported adjacent its ends by end support brackets 11 and, where required in longer rods, by one or more intermediate brackets (not shown). Cord guide pulley assemblies 12 are mounted inside the rod 10 and have a traverse cord 13 threaded thereover and connected to a master slide 14 for moving the same along the rod. In the embodiment shown, only one master slide is illustrated, as is suitable for one-way traverse operation, it being understood that a pair of master slides can be provided and connected to the traverse cords 13 for movement in relatively opposite directions toward and away from the center of the rod in a manner well known in the art. A plurality of auxiliary slides 15 are mounted in the rod and have drapery support pendants 16 for supporitng the drapery thereon.

The rod 10 may be formed in a suitable way as by rolling a strip of stock into desired shape or by extrusion. In the present embodiment, the rod is intended to simulate the conventional ring pole or the like and, as best shown in FIG. 4, has a rounded forward face 21 and upper and lower wall portions 22 and 23 at the rear side thereof, which wall portions have their edges 22a and 23a spaced apart to define a trackway extending lengthwise of the rod, preferably all the way to the ends of the same. The support brackets 11 are arranged to engage the rod at a point inwardly of the ends of the rod to provide an overhang beyond the end brackets, and end finials 25 are detachably mounted on the ends of the rods. For example, the finials may be made hollow and merely slipped onto the ends of the rods. The support brackets 11 are preferably shaped as shown in FIG. 4 to provide an upwardly opening U-shaped socket for receiving the rods and, as shown, the brackets 11 have a portion 28 which extends along the wall portions 22 and 23 at the rear side of the rod, and an upwardly and forwardly extending portion 29 that underlies the rod and projects upwardly to a level adjacent the top of the rod. A means is provided on the upwardly extending portion 29 for retaining the rod in the bracket and, as shown in FIG. 4, this means includes inwardly extending protrusions 31 which are struck out of the upwardly extending portion 29 of the bracket, which protrusions define an upper downwardly and inwardly inclined face 31a shaped to guide the rod into the support bracket and a lower face 31b shaped to engage the front face of the rod at a point above the center line of the rod and releasably hold the rod in the support bracket. The support bracket is made sufficiently resilient to allow the upwardly extending portion 29 to deflect laterally when the rod is forcibly pressed downwardly or upwardly, to thereby permit insertion and removal of the rod past the retaining protrusion 31. Alternatively, any other suitable means may be provided for releasably retaining the rod in the end bracket. The brackets themselves are mounted on the support surface such as a wall or window casing by any suitably shaped bracket structure (not shown) that engages the rearwardly extending leg 35 on the support bracket.

In traverse rods of the type illustrated which simulate conventional ring pole rods, it is customary to return the drapery to the wall at a point adjacent the end support brackets 11. The pulley housings 12 are mounted inside the rod 10 at a point inwardly of the ends of the rod and, preferably, the pulley housings are positioned in the rod inwardly of the end brackets 11 so that the downwardly extending runs of the traverse cord 13 are located inwardly of the end brackets so as to be concealed behind the drapery. As best shown in FIGS. 3–5, the pulley housing includes spaced front and rear walls 38 and 39 having cord guide pulleys 40 and 40a rotatably mounted therebetween, as on riveted pins 41. The front and rear walls of the pulley housing are preferably shaped so as to laterally locate the pulley housing in the rod and, for this purpose, are formed with flanges 38a and 39a on the front and rear walls respectively that engage the inner walls of the rod and center the pulley housing in the rod. The flanges 38a are inclined toward each other so as to engage the rounded front wall 21 of the rod and the flanges 39a engage the top and bottom of the rod adjacent the rear wall portions 22 and 23. The front and rear walls of the pulley housing may be maintained in proper spaced relation to each other in a suitable manner and, as shown in FIG. 3, have an end spacer lug 43 at one end and an integral web portion 44 at the other end extending between and connecting the front and rear walls of the housing. The rod has a cord opening 50 at its underside to allow the cords 13 to pass downwardly therethrough and a means is provided for locating the pulley housing in the rod in registry with the downwardly facing opening. As shown, a lateral projection or lug 44a is provided on the pulley housing and is conveniently struck out of the front wall 38 to extend laterally of the pulley housing and engage a protuberance 45 struck out from the rod, to thereby locate the pulley housing in the rod. The rod is sometimes formed of a relatively light gauge metal to minimize weight and cost and it has been found that merely anchoring the pulley housing to the rod is not entirely satisfactory since such anchor arrangements are not always sufficient to withstand the forces applied to the pulley housing during the operation of the traverse cords. As shown in FIGS. 3–5, the pulley housing is directly anchored to the rod end bracket 11 by a prong 47 formed on the end bracket, and which prong extends through an opening 48 in the rod in a position to engage a portion of the pulley housing such as the connecting web 44 to lock the pulley housing against movement lengthwise of the rod.

The slide 15 may be of any conventional construction and in general includes a slide body 51 which is slidably received in the trackway. As is conventional, the slide bodies have a head portion 52 (FIG. 5) at the inside of the rod, which head portion is larger than the width of the trackway so as to normally retain the slide bodies in the rod. In the embodiment illustrated, the slide bodies 51 have a generally rectangular configuration and have top and bottom grooves 53 which slidably and non-rotatably support the slides in the rods. The pendants 16 are attached to the slides and are preferably supported for swinging movement relative to the slides about a generally horizontal pivot axis 55. Decorative slide rings 56 may be mounted on the slide bodies, if desired to simulate the conventional rings of a ring pole rod. As shown in FIG. 1, the pendants 16 have a means such as the drapery hook receiving opening 16a for supporting a drapery.

It is sometimes necessary to add or remove slides 15 from the trackway, dependent upon the length of the drapery and the number of pleats in the drapery. In order to facilitate insertion and removal of the slides from the rod, a slide gate is provided on the rod inwardly of the end of the same. For this purpose, at least one and preferably both of the wall portions 22 and 23 are notched as indicated at 61 and 62 at a point inwardly of the end of the rod and adjacent the pulley housing 12. The notches intersect the trackway and have a length and width to provide an opening in the trackway larger than the head portion 52 of the slides to permit lateral insertion and removal of the slide body from the trackway intermediate the ends of the rod. The inner ends 61a and 62a of the notches 61 and 62 are preferably inclined as shown in FIGS. 1 and 2 to aid in centering the slides in the trackway, when inserting the slides. A slide gate 64 is mounted on the rod for movement into and out of position adjacent the notches in the trackway to selectively block movement of the slides out of the notches. The slide gate is advantageously constructed and formed as shown in FIGS. 2, 3 and 5 and includes a generally flat gate portion 65 which overlies the notches at the inner side of the rod, and which gate portion is connected through intermediate portion 66 to a mounting portion 67. The mounting portion is preferably secured to the pulley housing at the inside of the rod, as by a rivet 68 and the intermediate portion 66 is resilient and yieldably supports the gate portion for movement laterally of the wall portions 22 and 23 into an out of position overlying the notches. In the form shown in FIGS. 1–5, the intermediate portion is cut away to provide relatively narrow upper and lower bands that extend between the mounting portion and the gate portion. The resilient intermediate portion yieldably urges the gate to its closed position blocking the notches 61 and 62 and in order to facilitate manipulation of the gate portion to an open position, a tab 69 is provided on the gate and extends rearwardly through the trackway to the rear side of the rod. The tab 69 is shaped to provide a finger engaging portion disposed outside the rod at the rear side thereof which can be depressed to open the gate. As will be seen, the tab 69 is formed from the material struck out from the intermediate portion 66 of the gate, and the tab 69 can be pressed forwardly as shown in FIG. 5 to uncover the notches and allow the slides 51 to be inserted or removed from the trackway. Since the gate is yieldably movable inwardly to its open position, the slides can also be inserted in the trackway by merely passing the slides against the gate 65 to force the latter inwardly. The gate 65 is advantageously formed with a laterally extending flange 65a at one end which is adapted to engage the outer ends of the notches 61 and 62 in the rod when the gate is in its normally closed position to releasably lock the pulley mechanism against movement out of the rod.

A modified rod, pulley housing and slide gate is illustrated in FIGS. 6–8. The rod, pulley housing and gate are generally similar to that shown in FIGS. 1–5 and like numerals followed by the suffix (') are used to designate corresponding parts. In this embodiment, the rod designated 10' has a shape generally similar to that shown in FIGS. 1–5, but the rod has a somewhat smaller cross section. As in the preceding embodiment, the rod has arcuate front wall 21' and upper and lower rear wall portions 22' and 23' which have their adjacent edges spaced apart to define a trackway extending lengthwise of the rod. The rod is supported in an end bracket 11', which end bracket is also arranged to engage the rod inwardly of the end thereof and includes a generally U-shaped portion having a rear wall 28' and an upwardly and forwardly curved front wall 29'. A means such as a screw 31' is provided for releasably locking the rod on the end bracket. In order to provide adequate room for the cord pulleys 40', the pulley housing is mounted inside the rod at a point closely adjacent the rear wall of the rod. The pulley housing includes front and rear walls 38' and 39' having the pulleys 40' disposed therebetween and rotatably supported on rivets 41'. The front and rear walls of the pulley housing are also preferably arranged to laterally locate and center the pulley housing in the rod and, as best shown in FIG. 7, are arranged to engage the inner walls of the rod. Provision is made for directly anchoring the pulley housing to the end support bracket 11' and to the rod so that the axial thrust on the pulley housing which occurs during manipulation of the traverse cords, is directly transmitted to the end bracket. For this purpose, the pulley housing is provided with laterally extending tabs or projections 44' and 47' which extend rearwardly through the trackway and engage the rear portion 28' of the end bracket at opposite sides thereof. The tabs 44' and 47' are preferably formed integrally with the pulley housing and, as shown, are struck out from the rear wall 39'. The tab 44' is also preferably arranged to lock the pulley housing to the end to maintain the pulley housing in proper position relative to the cord opening 50' and, as shown in FIGS. 7 and 8 is made somewhat wider than the width of the trackway to lock in notches 48' in the adjacent edges of the top and bottom wall portions 22' and 23'. The rod is sufficiently resilient to allow spreading of the wall portions in the plane thereof for insertion of the pulley housing in the rod and the wall portions snap back when the tab 44' registers with the notches 48' to lock the pulley housing in position.

At least one and preferably both of the wall portions 22' and 23' are notched intermediate the ends of the rod and adjacent to pulley housing, which notch or notches intersect the trackway and have a length and width to provide an opening larger than the head portion of the slides to enable lateral insertion and removal of the slide body from the trackway. Since the pulley housing is located closely adjacent the rear wall of the rod, the notches designated 61' and 62' are located at a point just beyond the end of the pulley housing. As in the preceding embodiment, the inner ends of the notches 61' and 62' are inclined toward the trackway to aid in guiding the slides into the trackway during insertion of the slides.

The slide gate in this embodiment also overlies the notches at the inner side of the rod and includes a generally flat gate portion 65', an intermediate portion 66' and a mounting portion 67'. The mounting portion is secured to the pulley housing as by one of the rivets 41 and a centering protrusion 68'. At least the intermediate portion of the slide gate is made sufficiently resilient to permit movement of the gate laterally away from the rear wall portions 22' and 23'. The intermediate portion 66' is preferably cut away as best shown in FIG. 8 so that the intermediate portion is in the form of spaced bands that connect the mounting portion 67' to the gate portion 65'. A part of intermediate portion is bent laterally as best shown in FIG. 6 to provide a finger portion 69' that projects rearwardly through the trackway and the rod to the rear side of the rod. This not only provides clearance to enable movement of the gate laterally into the rod, but also provides a portion engageable by the finger of the user to enable manual depression of the gate to open the same. For reasons pointed out hereinafter, the finger portion 69' preferably has a width only slightly less than the width of the trackway so as to be guidably received between the edges of the wall portions 22' and 23'. With this arrangement, the finger portion functions to aid in locating the slide gate with respect to the trackway.

It is desirable to minimize the dead space at the end of the rod in which the slides cannot move. In the embodiment of FIGS. 6-8, the pulley housing is located closely adjacent the trackway and will block movement of the slides. In addition, the notches 61' and 62' for the slide gate are located beyond the end of the pulley housing. In order to reduce the dead space at the end of the rod, the slide gate 65' is preferably notched as best shown in FIG. 8 to allow the slides to move into the gate to a position closely adjacent the end of the pulley housing. In particular, the slide gate 65' is notched to provide upper and lower guide edges 70' and 71' which are spaced apart a distance approximately equal to the width of the trackway and are disposed in substantial alignment with the respective edge of the trackway to effectively form a continuation of the same. A cross piece 72' extends between the edges 70' and 71' and forms a stop for the slides. With this arrangement, the slides 15 indicated in phantom in FIG. 8 can move along the rod and past the notches 61' and 62', when the slide gate is in its closed position. In order to remove slides, it is only necessary to shift the slide gate 65' laterally away from the rear wall of the rod to uncover the notches.

A further modified form of pulley housing and slide gate is illustrated in FIGS. 9 and 10. In this embodiment, the rod designated 10" has the same general configuration as that described in connection with FIGS. 1-5 and the rod support bracket designated 11" and the pulley housing 12" are also conveniently constructed and arranged in the manner previously described in connection with FIGS. 1-5. The rod of FIGS. 9 and 10 however, has a modified form of slide gate and a modified arrangement for anchoring the pulley housing to the rod bracket 11. As shown in FIG. 9, the rod 10" has a notch designated 62" in only one of the wall portions 23". The notch 62" intersects the trackway and has a length and width to provide an opening in the trackway larger than the head portion of the slide to enable lateral insertion and removal of the slide body from the trackway. The slide gate includes a generally flat gate portion 65" which overlies the notch at the inner side of the rod, an intermediate portion 66" and a mounting portion 67". The mounting portion is secured to the pulley housing as by a rivet 68" and the intermediate portion is made sufficiently resilient and flexible to permit lateral movement of the gate portion into and out of overlying relation with the notch. The intermediate portion 66" is advantageously shaped as shown in FIG. 10 to provide a rearwardly offset portion that extends through the trackway to the rear side of the rod. This provides a portion disposed outside the rod and which can be manipulated by the finger of the user to shift the gate away from the rod. In addition, the intermediate portion 66 is advantageously only slightly narrower than the trackway so as to aid in locating the gate portion with respect to the trackway. In order to allow movement of the slides closer to the end of the rod, the gate portion is advantageously notched to provide an edge 71" generally aligned with one edge of the trackway and a transversely extending stop edge 72". In this embodiment, the member which forms the slide gate is also preferably shaped to provide an anchor means to directly anchor the pulley housing to the rod support bracket 11". As best shown in FIG. 10, the mounting portion 67" has a laterally resilient portion 80 extending from the mounting rivet 68" and a rearwardly extending portion 81 that extends out through the trackway at the rear side of the rod. The rearwardly extending portion 81 has a stepped configuration and terminates in a generally L-shaped tab 82 at the rear side of the rod. The tab 82 is arranged to engage one edge of the support bracket 11" to directly anchor the pulley housing to the support bracket. In addition, the rear walls 22" and 23" of the rod are advantageously notched to receive the rear projection 81, as indicated at 84 in FIGS. 9 and 10, to also anchor and locate the pulley housing with respect to the rod. In this manner, movement of the pulley housing along the rod is precluded, even when the pulley housing is out of the rod bracket.

From the foregoing it will be seen that the rod, pulley housing and slide gate are constructed and arranged so that the slide gate normally retains the slides in the rod whereby the slides cannot fall out of the rod during handling or shipment of the rods. However, when necessary, slides can be readily inserted or removed from the rod intermediate the ends thereof through the gate. Further, when the slides are of the type which do not have the decorative ring members 56 attached thereto, the slides can be removed from the rod without removing the rod from its support brackets 11. In each of the embodiments, the slide gate is mounted on and carried by the pulley housing within the rod and is thus enclosed and substantially concealed by the rod. Moreover, the slide gates are constructed and arranged so as to minimize the dead space at the ends of the rod. In the embodiment of FIGS. 1-5, the notches in the rod and the slide gate are located at the rear side of the pulley housing so that the slides in the rod can move up to the end of the pulley housing. In the embodiments of FIGS. 6-10, the slide gates are shaped so as to effectively form continuations of the trackway, when the gates are in their closed positions, to allow movement of the slides along the gates and at least partially past the notches. The gates can, however, be shifted laterally away from the notches to uncover the same and permit insertion and removal of slides from the rod. In these embodiments, the intermediate portion on the slide gate shown at 66′ in FIG 6 and 66″ in FIG. 9 is constructed and arranged so that it also aids in aligning the edges of the notched slide gate with the track. In addition, the pulley housings are constructed and arranged to have portions which extend laterally through the trackway and to engage and directly anchor the pulley housing to the end brackets.

I claim:

1. In a traverse rod having lengthwise extending wall portions with adjacent edges thereof spaced apart to define a trackway therebetween, a plurality of slides each including a body slidably received in said trackway and having a head portion inside the trackway larger than said slot to normally retain the body on the trackway, the slides each having means outside the rod for attaching a drapery thereto, a pulley housing having a cord guide pulley thereon mounted in said rod inwardly of the end of the rod; the improvement comprising, said pulley housing having at least a portion spaced laterally from said wall portions of the rod to provide a passage therebetween for the head portions of the slides, at least one of said wall portions having a notch therein intermediate the ends of the rod and adjacent said portion of the pulley housing, the notch intersecting the trackway and having a length and width to provide an opening in said trackway larger than said head portion to enable lateral insertion and removal of the slide body from the trackway, and a slide gate having means mounting the same on the pulley housing for movement relative thereto in said passage into and out of a position adjacent said notch to selectively block movement of slides out through the notch.

2. In a traverse rod having lengthwise extending wall portions with adjacent edges thereof spaced apart to define a trackway therebetween, a plurality of slides each including a body slidably received in said trackway and having a head portion inside the trackway larger than said slot to normally retain the body on the trackway, the slides each having means outside the rod for attaching a drapery thereto, a pulley housing having a cord guide pulley thereon mounted in said rod inwardly of the end of the rod; the improvement comprising at least one of said wall portions having a notch therein intermediate the ends of the rod and adjacent the pulley housing, the notch intersecting the trackway and having a length and width to provide an opening in said trackway larger than said head portion to enable lateral insertion and removal of the slide body from the trackway, and a slide gate mounted on the pulley housing for movement relative to the pulley housing and rod into and out of position adjacent said notch to selectively block movement of slides out of the rod through the notch.

3. In a traverse rod having lengthwise extending wall portions with adjacent edges thereof spaced apart to define a trackway therebetween, a plurality of slides each including a body slidably received in said trackway and having a head portion inside the trackway larger than said slot to normally retain the body on the trackway, the slides each having means outside the rod for attaching a drapery thereto, a pulley housing having a cord guide pulley thereon mounted in said rod inwardly of the end of the rod; the improvement comprising at least one of said wall portions having a notch therein intermediate the ends of the rod and adjacent the pulley housing, the notch intersecting the trackway and having a length and width to provide an opening in said trackway larger than said head portion to enable lateral insertion and removal of the slide body from the trackway, and a slide gate mounted on the pulley housing having a gate portion disposed inside the rod and overlapping said one wall portion adjacent the notch to normally prevent movement of slides out of the rod through the notch, the slide gate including means supporting the gate portion for movement relative to the pulley housing and rod laterally away from said wall portions to uncover the notch and allow insertion and removal of slides from the rod.

4. In a traverse rod having lengthwise extending wall portions with adjacent edges thereof spaced apart to define a trackway therebetween, a plurality of slides each including a body slidably received in said trackway and having a head portion inside the trackway larger than said slot to normally retain the body on the trackway, the slides each having means outside the rod for attaching a drapery thereto, a pulley housing having a cord guide pulley thereon mounted in said rod inwardly of the end of the rod; the improvement comprising at least one of said wall portions having a notch therein intermediate the ends of the rod and adjacent the pulley housing, the notch intersecting the trackway and having a length and width to provide an opening in said trackway larger than said head portion to enable lateral insertion and removal of the slide body from the trackway, and a slide gate comprising a resilient member having a gate portion at one end disposed inside the rod and overlapping said one wall portion adjacent the notch to normally prevent movement of slides out of the rod through the notch, means attaching the resilient member to the pulley housing at a point spaced from the gate portion whereby the gate portion is resiliently movable laterally of the wall portion into and out of overlying relation to said notch, and means defining interengaging shoulders on said resilient member and said rod for limiting lengthwise movement of the pulley housing in the rod.

5. In a traverse rod having lengthwise extending wall portions with adjacent edges thereof spaced apart to define a trackway therebetween, a plurality of slides each including a body slidably received in said trackway and having a head portion inside the trackway larger than said slot to normally retain the body on the trackway, the slides each having means outside the rod for attaching a drapery thereto, a pulley housing having a cord guide pulley thereon mounted in said rod inwardly of the end of the rod; the improvement comprising at least one of said wall portions having a notch therein intermediate the ends of the rod and adjacent the pulley housing, the notch intersecting the trackway and having a length and width to provide an opening in said trackway larger than said head portion to enable lateral insertion and removal of the slide body from the trackway, and a slide gate having a gate portion adapted to extend alongside said one wall portion in overlying relation to said notch, said gate portion having an edge approximately aligned with the edge of said one wall portion when the gate portion extends alongside the latter to provide a continuation of the edge of said one wall portion, and means supporting said gate portion for movement out of overlying relation to said notch to allow insertion and removal of slides from the rod.

6. The combination of claim 5 wherein said slide gate has means thereon engageable with the edges of the wall portions of the rod adjacent one end of the notch for aiding in aligning said edge of the gate portion with the edge of said one wall portion.

7. In a traverse rod having lengthwise extending wall portions with adjacent edges thereof spaced apart to define a trackway therebetween, a plurality of slides each including a body slidably received in said trackway and having a head portion inside the trackway larger than said slot to normally retain the body on the trackway, the slides each having means outside the rod for attaching a drapery thereto, a pulley housing having a cord guide pulley thereon mounted in said rod inwardly of the end of the rod; the improvement comprising at least one of said wall portions having a notch therein intermediate the ends of the rod and adjacent the pulley housing, the notch intersecting the trackway and having a length and width to provide an opening in said trackway larger than said head portion to enable lateral insertion and removal of the slide body from the trackway, and a slide gate having a mounting portion attached to the pulley housing inside the rod and a gate portion movable relative to the pulley housing and rod into and out of position adjacent said notch for selectively blocking movement of slides out through the notch, said gate including a portion extending through the trackway to the outer side of the rod for manual operation of the slide gate out of position blocking movement of slides out through the notch.

8. In a traverse rod having lengthwise extending wall portions with adjacent edges thereof spaced apart to define a trackway therebetween, a plurality of slides each including a slide body slidably received in said trackway and having a head portion inside the trackway larger than said slot to normally retain the body on the trackway, the slides having means outside the rod for attaching a drapery thereto, a pulley housing having a cord guide pulley thereon mounted in said rod inwardly of the end of the rod; the improvement comprising said wall portions having registering notches therein intermediate the ends of the rod and adjacent the pulley housing, the notches intersecting the trackway and having a length and width to provide an opening in said trackway larger than the head portions on the slide bodies to enable lateral insertion and removal of the slide bodies from the trackway, and a slide gate having means mounting the same on the rod for movement into and out of a position adjacent said notches for selectively blocking movement of the slides out through the notches, said slide gate having a gate portion including spaced side edges approximately aligned with a respective one of said edges of the wall portions to receive said slide bodies and a stop portion extending between said spaced side edges to stop movement of said slide bodies.

9. In a traverse rod having lengthwise extending wall portions at the rear side thereof with adjacent edges thereof spaced apart to define a trackway therebetween, a plurality of slides each including a body slidably received in said trackway and having a head portion inside the trackway larger than said slot to normally retain the body on the trackway, a rod support bracket having a rod engaging portion extending at least part way around the rod intermediate the ends of the rod, a pulley housing having a cord guide pulley thereon mounted in said rod inwardly of the end of the rod; the improvement comprising anchor means on said pulley housing extending laterally of the pulley housing out through said trackway and engaging said rod support bracket to anchor the pulley housing against movement axially of the rod toward the center thereof.

10. The combination of claim 9 wherein said anchor means comprises a tab integral with said pulley housing.

11. The combination of claim 9 wherein said rod has a notch therein engageable with said anchor means to locate the pulley housing in the rod when the rod is out of the end bracket.

12. The combination of claim 9 wherein said anchor means comprises first and second tabs rigid with said pulley housing and spaced apart thereon a distance sufficient to receive the rod engaging portion of said bracket therebetween.

13. The combination of claim 12 wherein said rod has a notch therein engageable with one of said tabs to locate the pulley housing in the rod when the rod is out of the end bracket.

14. In a traverse rod having lengthwise extending wall portions at the rear side thereof with adjacent edges thereof spaced apart to define a trackway therebetween, a plurality of slides each including a body slidably received in said trackway and having a head portion inside the trackway larger than said slot to normally retain the body on the trackway, a rod support bracket having a rod engaging portion extending at least part way around the rod intermediate the ends of the rod, a pulley housing having a cord guide pulley thereon mounted in said rod inwardly of the end of the rod; the improvement comprising at least one of said wall portions having a notch therein intermediate the ends of the rod and adjacent the pulley housing, the notch intersecting the trackway and having a length and width to provide an opening in the trackway larger than the head portion on the slides to enable lateral insertion and removal of the slide bodies from the trackway, a slide gate comprising a resilient member having a gate portion at one end disposed inside the rod and overlapping said one wall portion adjacent said notch to normally prevent movement of the slides out of the rod through the notch, means attaching said resilient member to the pulley housing at a point spaced from the gate portion whereby the gate portion is resiliently movable laterally of the wall portion into and out of overlying relation to said notch, and anchor means on said resilient member extending laterally of the pulley housing through said trackway and engaging said support bracket to anchor the pulley housing against movement axially of the rod toward the center thereof.

References Cited
UNITED STATES PATENTS

| | | | |
|---|---|---|---|
| 2,757,804 | 8/1956 | Sadwin | 16—87.6 X |
| 2,889,573 | 6/1959 | Bell et al. | |
| 3,049,176 | 8/1962 | Graber et al. | 160—346 |
| 3,104,086 | 9/1963 | Salzmann. | |
| 3,119,442 | 1/1964 | Ford et al. | 160—345 |

DAVID J. WILLIAMOWSKY, *Primary Examiner.*

HARRISON R. MOSELEY, *Examiner.*

P. C. KANNAN, *Assistant Examiner.*